US006628377B1

United States Patent
Sabatini et al.

(10) Patent No.: US 6,628,377 B1
(45) Date of Patent: Sep. 30, 2003

(54) SCANNING OPTICAL SEMICONDUCTOR FINGERPRINT DETECTOR

(75) Inventors: Marco Sabatini, Kensington, CA (US); Frederic Raynal, Berkeley, CA (US); Bhusan Gupta, Palo Alto, CA (US)

(73) Assignee: STMicroelectronics, Inc., Carrollton, TX (US)

(*) Notice: Subject to any disclaimer, the term of this patent is extended or adjusted under 35 U.S.C. 154(b) by 0 days.

(21) Appl. No.: 09/542,428

(22) Filed: Apr. 4, 2000

(51) Int. Cl.[7] .................................................. G06K 9/74
(52) U.S. Cl. ......................... 356/71; 382/126; 382/124
(58) Field of Search ........................... 356/71; 250/556; 382/116, 124, 126, 284; 283/78

(56) References Cited

U.S. PATENT DOCUMENTS

| | | | | |
|---|---|---|---|---|
| 4,692,603 A | * | 9/1987 | Brass et al. ................... 356/71 |
| 4,784,484 A | | 11/1988 | Jensen ........................... 356/71 |
| 5,177,802 A | * | 1/1993 | Fujimoto et al. ............ 382/124 |
| 5,195,145 A | * | 3/1993 | Backus et al. ............... 382/126 |
| 5,467,403 A | | 11/1995 | Fishbine et al. ............. 382/116 |
| 5,548,394 A | | 8/1996 | Giles et al. .................... 356/71 |
| 6,178,255 B1 | * | 1/2001 | Scott et al. ................... 382/124 |
| 6,259,108 B1 | * | 7/2001 | Antonelli et al. ............ 250/556 |
| 6,324,310 B1 | * | 11/2001 | Brownlee ..................... 356/71 |

* cited by examiner

Primary Examiner—Zandra V. Smith
(74) Attorney, Agent, or Firm—Lisa K. Jorgenson; William A. Munck

(57) ABSTRACT

A narrow array optical fingerprint detector that substantially eliminates over-sampling of the array measures the speed of a finger moving over the array and scans the array at a rate determined by the speed of movement of the finger. The fingerprint detector measures the speed of finger movement with a transparent cylinder rotatably mounted adjacent the array. The transparent cylinder is mounted to engage the finger and rotate as the finger is swept past the array. A light chopper is mounted for rotation with the cylinder. A photo-sensor is mounted adjacent the light chopper. The photo-sensor produces a signal in response to light being chopped by the light chopper. The photo-sensor is operably connected to scanning circuitry. Each time the scanning circuitry receives a signal from the photo-sensor, the scanning circuitry scans the array.

21 Claims, 2 Drawing Sheets

SCANNING OPTICAL SEMICONDUCTOR FINGERPRINT DETECTOR

FIELD OF THE INVENTION

The present invention relates generally to the field of methods of and systems for capturing fingerprint images, and more particularly to an optical semiconductor fingerprint scanning device.

DESCRIPTION OF THE PRIOR ART

Fingerprint recognition has been suggested for use in many security applications, such as controlling access to buildings, computers, or the like. Fingerprint recognition systems enable a user to access the controlled facility without having to provide a device such as a keypad or card reader, and without having the user memorize a password, or other personal identification number.

The sensing device is an important part of a fingerprint recognition system. The quality of the fingerprint image that the sensing device produces will affect recognition capability and the amount of processing required for verification of the fingerprint.

Various technologies have been proposed for use in fingerprint sensing devices. One commonly proposed technology involves optical image detection. Examples of optical fingerprint detection devices are disclosed in Jensen, U.S. Pat. No. 4,784,484; Fishbine, et al., U.S. Pat. No. 5,467,403; and Giles, et al., U.S. Pat. No. 5,548,394.

The fingerprint sensing device captures the fingerprint image with an array of sensing elements. In one design, the fingerprint image is captured with a relatively large array. The user places the finger tip over the array, and the array is scanned to capture the fingerprint image.

Acceptable images can be captured using a resolution of about 500 dpi, which requires a sensing element size of about 50 microns. A large array that can capture a fingerprint image in a single scan is typically about 360 by 256. A large array device can capture many fingerprint features and minutiae, which leads to accurate fingerprint recognition. A large array device captures an entire fingerprint image in a single scan. Accordingly, the fingerprint image does not need to be reconstructed. However, the larger the array, the higher the cost of the device.

An alternative to large array devices are narrow array devices. In a narrow array device, the array has a first dimension that is about the width of a fingerprint and a length that is substantially less than the length of a fingerprint. The fingerprint image is captured as the user sweeps the finger tip over the narrow array as the array is scanned. On each scan, the narrow array captures a partial image or slice of the fingerprint. A regeneration algorithm assembles the slices into the complete fingerprint image.

One of the problems with narrow array devices is that the speed at which the finger is swept over the array is unknown. In order to reconstruct the fingerprint image, a pair of consecutive slices must have enough rows in common for them to be aligned by the regeneration algorithm. Thus, the fingerprint image must be over-sampled. Since different speeds and the speed at which a person moves the finger during any particular sweep is generally not uniform, the fingerprint image must be highly over-sampled.

The narrow array must be scanned at a relatively high clock rate to ensure that the fingerprint image is sufficiently over-sampled. The over-sampling required for accurate image reconstruction requires substantial memory buffer. The regeneration algorithm required for reconstructing the image requires processor resources. If reconstruction processing is done in the host computer, substantial memory and processing are required. If reconstruction processing is performed on the chip, then substantial memory and a digital signal processor (DSP) are required on the chip.

Thus, although a narrow array device is less expensive to build than a large array device, narrow array devices may be more expensive in terms of memory and processing resources.

SUMMARY OF THE INVENTION

The present invention provides a narrow array optical fingerprint detector that substantially eliminates over-sampling of the array, thereby eliminating reconstruction and additional memory requirements. The fingerprint detector includes an array of optical sensing elements. The fingerprint detector of the present invention measures the speed of a finger moving over the array and scans the array at a rate determined by the speed of movement of the finger.

In the preferred embodiment, the fingerprint measures the speed of finger movement with a transparent cylinder rotatably mounted adjacent the array. The transparent cylinder is mounted to engage the finger and rotate as the finger is swept past the array. A light chopper is mounted for rotation with the cylinder. A photo-sensor is mounted adjacent the light chopper. The photo-sensor produces a signal in response to light being chopped by the light chopper. The photo-sensor is operably connected to scanning circuitry. Each time the scanning circuitry receives a signal from the photo-sensor, the scanning circuitry scans the array.

The fingerprint detector of the present invention may also include wake-up and idle circuitry operably connected to the photo-sensor. The wake-up and idle circuitry places the fingerprint detector into an idle or standby state after a predetermined delay in receiving a signal from the photo-sensor. The wake-up and idle circuitry places the fingerprint detector into an active state in response to receiving a signal from the photo-sensor when the fingerprint detector is in the idle state.

DESCRIPTION OF THE PREFERRED EMBODIMENT

Figure 1:
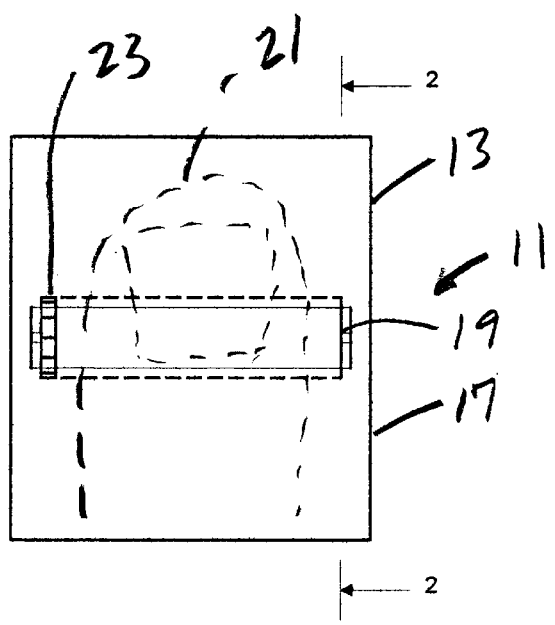
FIG. 1 is a top view of the fingerprint detector of the present invention.
Figure 2:
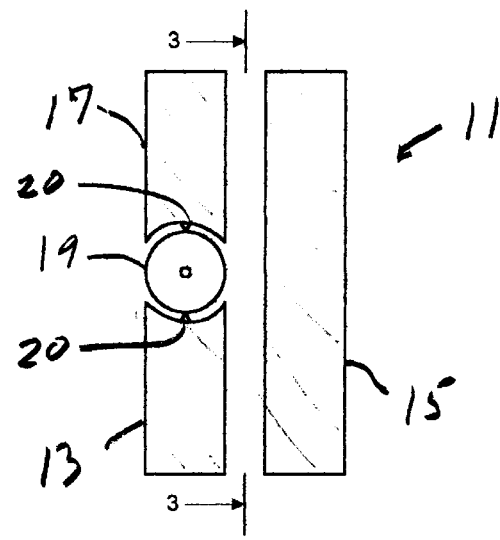
FIG. 2 is a view taken along line 2—2 of FIG. 1.
Figure 3:
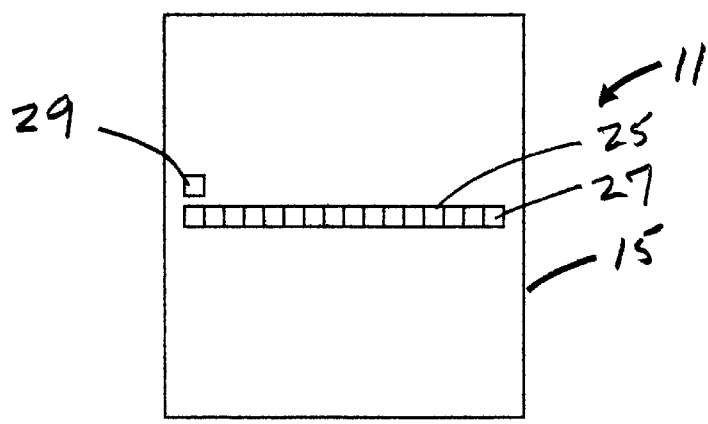
FIG. 3 is a view taken along line 3—3 of FIG. 2.

Referring now to the drawings, and first to FIGS. 1–3, a fingerprint detector according to the present invention is designated generally by the numeral 11. Fingerprint detector 11 includes a mechanical assembly 13 spaced apart from a silicon chip device 15.

Mechanical assembly 13 includes a rectangular support structure 17. A cylinder 19 is mounted for rotation on a suitable axle and bearing combination in a channel formed in support structure 17. Cylinder 19 is made of a transparent material such as glass or a suitable clear plastic. Cylinder 19 is adapted to be rotated by a finger indicated in phantom at 21. As shown in FIG. 2, a pair of brooms or wipers 20 are mounted in the channel of support structure 17 to engage cylinder 19. Wipers 20 serve to keep cylinder 19 clean and to prevent the passage of foreign material through the channel of support structure 17 to the surface of silicon chip device 15.

Cylinder 19 includes or is coupled to a light chopper 23. Light chopper 23 is preferably a glass or clear plastic cylinder integral with, or mounted for rotation with, cylinder 19. In the illustrated embodiment, light chopper 23 includes a plurality of longitudinal lines or stripes formed on the outer surface thereof by etching or the like. As light chopper 23 rotates with cylinder 19, the lines or stripes of light chopper 23 chop the light that reaches silicon chip device 15 through the channel of mechanical assembly 13. Alternatively, light chopper 23 may include radially extending spoke-like lines or stripes formed on the end thereof. A light source, such as a light emitting diode (LED) (not shown) may be provided to provide light for light chopper 23 to chop.

Silicon chip device 15 includes a scanning array 25 of optical sensing elements 27. Optical sensing elements 27 are preferably CMOS optical sensors, whereby array 25 comprises a CMOS imager. In the preferred embodiment, optical sensing elements 27 are sized and positioned to provide a resolution of about 500 dpi. Thus, optical sensing elements 27 are preferably on a pitch of about 50 microns. Preferably, array 25 is one-dimensional comprising a single row and about 256 columns. However, array 25 may comprise two or more rows and about 256 columns. In any event, as will be explained in detail hereinafter, the number of rows of array 25 and the construction of light chopper 23 are arranged such that array 25 captures a partial fingerprint image on each scan without over-sampling.

Silicon chip device 15 also includes a photo-sensor 29. Photo-sensor 29 is positioned on silicon chip device to receive light chopped by light chopper 23. Photo-sensor 29 produces an electrical signal in response to a light signal from light chopper 23. As the light is chopped, the photo-sensor 29 produces alternating rising and falling edge signals. As will be explained in detail hereinafter, photo-sensor 29 is electrically coupled to circuitry for placing fingerprint detector 11 in active and idle states and circuitry for controlling the scan rate of the array 25 of the CMOS imager.

Figure 4:
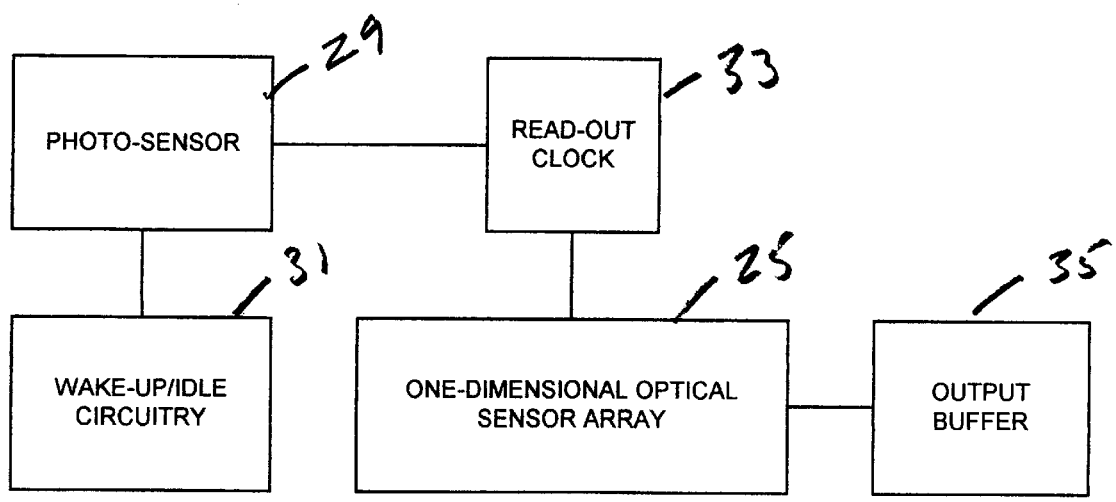
FIG. 4 is a block diagram of the fingerprint detector of the present invention.

Referring now to FIG. 4, there is shown a block diagram of the electrical functional elements of the present invention. Photo-sensor 29 is coupled to wake-up/idle circuitry 31 and a read-out clock 33. Wake-up/idle circuitry 31 is adapted to place silicon chip device 15 alternatingly in an active state and an idle or standby state in response to signals from photo-sensor 29. Read-out clock 33 scans array 25 at the rate given by photo-sensor 29. In the preferred embodiment, when silicon chip device 15 is in the active state, read-out clock 33 operates to scan array 25 once in response to each signal received from photo-sensor 29. As each slice of a fingerprint image moves over array 25, as indicated by light chopper 23 and photo-sensor 29, array 25 is scanned to capture an image of the slice and the scanned image is sent to an output buffer 35. On successive scans, the fingerprint image is assembled without over-sampling. The image data captured and assembled in output buffer 35 is substantially the same as the image data produced by a large array device.

While the preferred array is a one-dimensional CMOS imager having a single row and plurality of columns, the array may comprise multiple rows and columns. In the multiple row and column embodiment, the scan would comprise a combination of vertical and horizontal scans.

Figure 5:
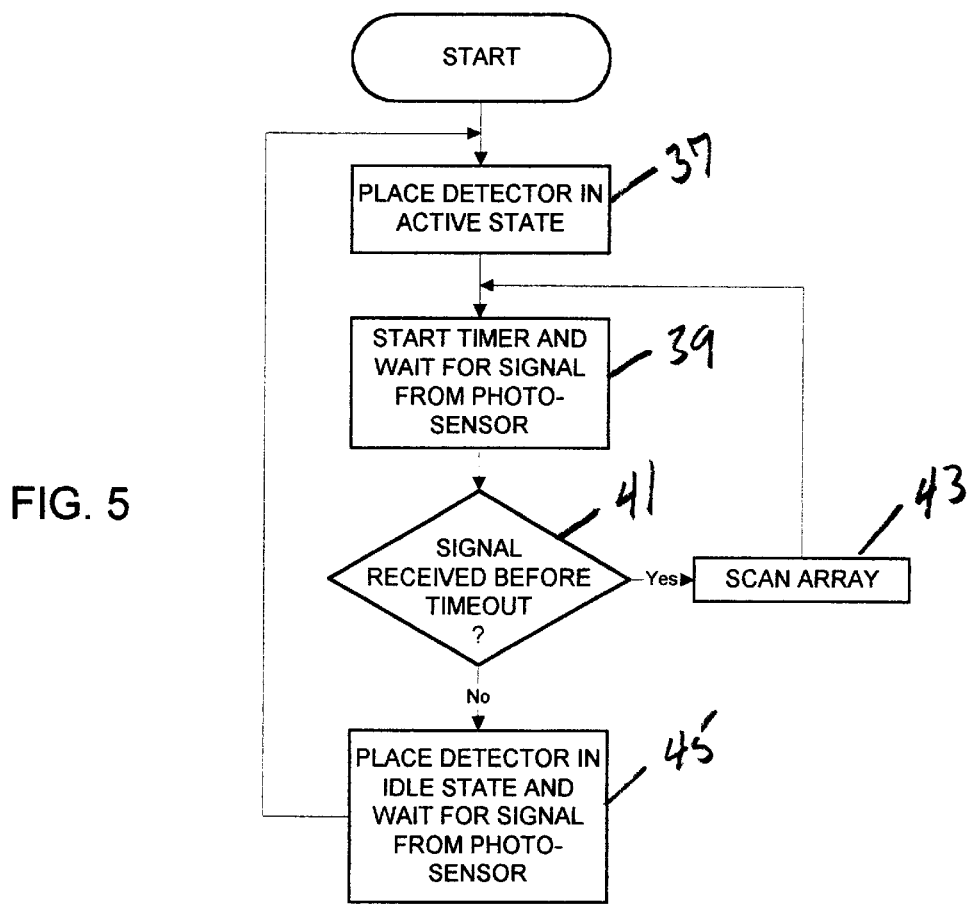
FIG. 5 is a flowchart of processing according to the present invention.
Figure 1:
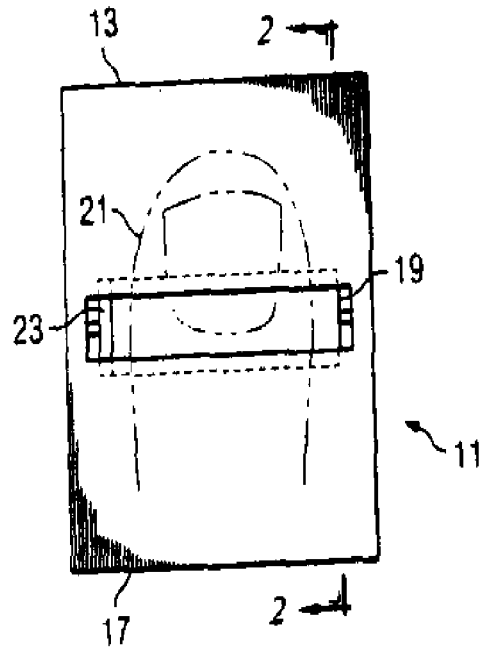
Figure 3:
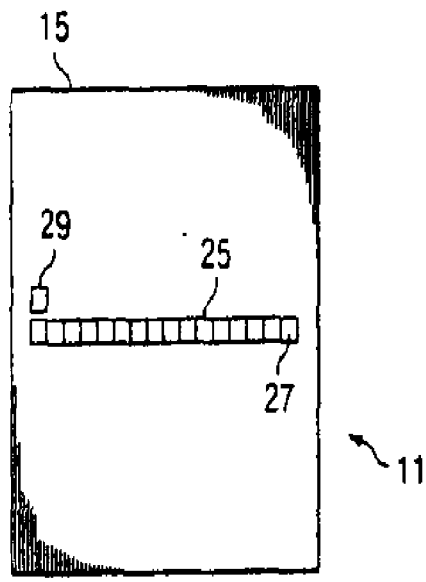
Figure 2:
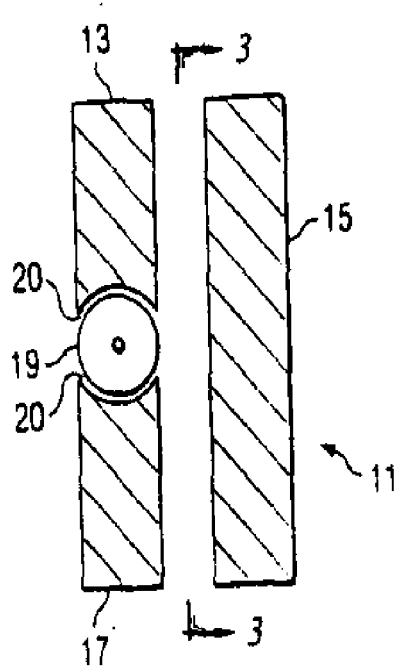
Figure 4:
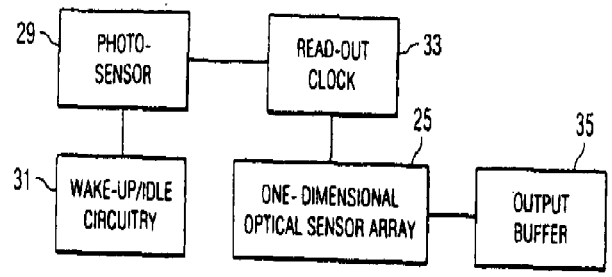
Figure 5:
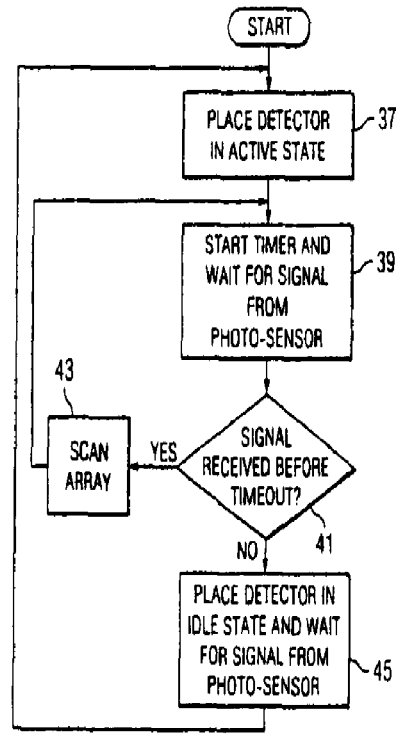

Referring now to FIG. 5, there is shown a flowchart of processing according to the present invention. When processing is started, the fingerprint detector is placed in the active state, as indicated at block 37. Then, the system starts a timer and waits for a signal from photo-sensor 29, at block 39. The time-out for the timer is set according to the preferences of the system designer. If, as determined at decision block 41, a signal is received from photo-sensor 29 before the timer times out, the system scans array 25 at the sweeping speed of the finger, as indicated at block 43, and returns to 39. If the timer times out before a signal is received from photo-sensor 29, the system places the detector in the idle state and waits for a signal from photo-detector 29, as indicated at block 45. When the system receives a signal from-photo-detector 25, processing returns to block 37.

The present invention provides a small area sensor array and eliminates the need for the substantial on-chip memory and the DSP required for image reconstruction. Therefore, additional space on the chip is available for other devices and functions. In the preferred embodiment, silicon chip device 15 is super integrated in that all functions required for fingerprint image capture and authentication are integrated into a single chip. Thus, in addition to photo-sensor 29, CMOS imager array 25, and the active/idle and scan control circuitry, silicon chip device includes memory to store the template as well as algorithms for minutia extraction, matching, recognition core, and anti-spoofing. A microcontroller is integrated into silicon chip device 15 to manage all of the operations performed by the chip. Silicon chip device 15 also preferably includes encryption.

From the foregoing, it may be seen that the fingerprint detector of the present invention overcomes the shortcomings of the prior art. The fingerprint detector of the present invention combines the reduced cost of a narrow array device with the reduced processing and memory requirements of a large array device.

The fingerprint detector of the present invention has been illustrated and described with reference to a presently preferred embodiment. Those skilled in the art, given the benefit of this disclosure, will recognize alternative embodiments. Accordingly, the foregoing description is intended for purposes of illustration and not of limitation.

What is claimed is:

1. A fingerprint detector, which comprises:
   an array of optical sensing elements;
   means for measuring the speed of a finger moving over said array; and
   means for scanning said array at a rate determined by said speed of said movement of said finger to acquire images of non-overlapping portions of a fingerprint.

2. The fingerprint detector as claimed in claim 1, wherein said means for measuring the speed of a moving finger includes:
   a substantially transparent cylinder rotatably mounted adjacent said array;
   and means for measuring the speed of rotation of said cylinder.

3. The fingerprint detector as claimed in claim 2, wherein said means for measuring the speed of rotation of said cylinder includes:
   a light chopper mounted for rotation with said cylinder; and,
   a photo-sensor adjacent said light chopper, said photo-sensor producing a signal in response to light chopped by said light chopper.

4. The fingerprint detector as claimed in claim 3, wherein said means for scanning said array includes scanning circuitry operably connected to said photo-sensor, said scanning circuitry scanning said array in response to said signal from said photo-sensor.

5. The fingerprint detector as claimed in claim 3, including:
   means for putting said fingerprint detector in an idle state in response to a predetermined delay after a signal produced by said photo-sensor.

6. The fingerprint detector as claimed in claim 5, including:
   means for putting said fingerprint detector in an active state in response to a signal produced by said photo-sensor while said fingerprint detector is in said idle state.

7. The fingerprint detector as claimed in claim 1, including:
   means for putting said fingerprint detector in an active state in response to detection of movement of a finger.

8. The fingerprint detector as claimed in claim 1, including:
   means for putting said fingerprint detector in an idle state in response to a predetermined delay after detection of movement of a finger.

9. The fingerprint detector as claimed in claim 8, including:
   means for putting said fingerprint detector in an active state in response to detection of movement of a finger while said fingerprint detector is in said idle state.

10. The fingerprint detector as claimed in claim 1, wherein said array comprises a single row of optical sensing elements.

11. The fingerprint detector as claimed in claim 1, wherein said array comprises a CMOS imager.

12. The fingerprint detector as claimed in claim 11, wherein said CMOS imager is one-dimensional.

13. A fingerprint detector, which comprises:
   an array of optical sensing elements;
   a substantially transparent cylinder rotatably mounted with respect to said array;
   means for measuring the speed of rotation of said cylinder; and
   means for scanning said array at a rate determined by said speed of rotation of said cylinder to acquire images of non-overlapping portions of a fingerprint.

14. The fingerprint detector as claimed in claim 13, wherein said means for measuring said speed of rotation of said cylinder includes:
   a light chopper mounted for rotation with said cylinder; and,
   a photo-sensor adjacent said light chopper, said photo-sensor producing a signal in response to light chopped by said light chopper.

15. The fingerprint detector as claimed in claim 14, wherein said means for scanning said array includes scanning circuitry operably connected to said photo-sensor, said scanning circuitry scanning said array in response to said signal from said photo-sensor.

16. The fingerprint detector as claimed in claim 14, including:
   means for putting said fingerprint detector in an idle state in response to a predetermined delay after a signal produced by said photo-sensor.

17. The fingerprint detector as claimed in claim 16, including:
   means for putting said fingerprint detector in an active state in response to a signal produced by said photo-sensor while said fingerprint detector is in said idle state.

18. A fingerprint detector, which comprises:
   an array of optical sensing elements;
   a light chopper movable in response to finger movement adjacent said array;
   a photo-sensor adjacent said light chopper, said photo-sensor producing a signal in response to light chopped by said light chopper; and
   scanning circuitry operably connected to said photo-sensor, said scanning circuitry scanning said array in response to said signal from said photo-sensor to acquire images of non-overlapping portions of a fingerprint.

19. The fingerprint detector as claimed in claim 18, including:
   wake-up and idle circuitry operably connected to said photo-sensor, said wake-up and idle circuitry being adapted to:
      place said fingerprint detector in an idle state in response to a predetermined delay after a signal produced by said photo-sensor; and
      place said fingerprint detector in an active state in response to a signal produced by said photo-sensor while said fingerprint detector is in said idle state.

20. The fingerprint detector as claimed in claim 18, wherein said array comprises a one-dimensional CMOS imager.

21. A fingerprint detector comprising:
   an array of optical sensing elements;
   a light chopper movable in response to finger movement adjacent said array;
   a photo-sensor adjacent said light chopper, said photo-sensor producing a signal in response to light chopped by said light chopper; and
   scanning circuitry operably connected to said photo-sensor, said scanning circuitry scanning said array in response to said signal from said photo-sensor,
   wherein said light chopper is mounted for rotation with a transparent cylinder rotatably mounted adjacent said array.

* * * * *

UNITED STATES PATENT AND TRADEMARK OFFICE
CERTIFICATE OF CORRECTION

PATENT NO. : 6,628,377 B1
DATED : September 30, 2003
INVENTOR(S) : Marco Sabatini et al.

It is certified that error appears in the above-identified patent and that said Letters Patent is hereby corrected as shown below:

<u>Drawings,</u>
Delete Figures 1-3 and replace with the following formal drawings.
Delete Figures 4-5 and replace with the following formal drawings.

Signed and Sealed this

Twenty-third Day of May, 2006

JON W. DUDAS
*Director of the United States Patent and Trademark Office*